United States Patent
Mancini (10) Patent No.: US 9,586,347 B2
(45) Date of Patent: Mar. 7, 2017

(54) METHOD OF MAKING A MULTILAYER ARTICLE

(71) Applicant: Philip Morris Products S.A., Neuchatel (CH)

(72) Inventor: Roberto Mancini, Bofflens (CH)

(73) Assignee: Philip Morris Products S.A., Neuchatel (CH)

( * ) Notice: Subject to any disclaimer, the term of this patent is extended or adjusted under 35 U.S.C. 154(b) by 61 days.

(21) Appl. No.: 14/379,378

(22) PCT Filed: Feb. 21, 2013

(86) PCT No.: PCT/EP2013/053467
§ 371 (c)(1),
(2) Date: Aug. 18, 2014

(87) PCT Pub. No.: WO2013/124360
PCT Pub. Date: Aug. 29, 2013

(65) Prior Publication Data
US 2015/0021806 A1 Jan. 22, 2015

(30) Foreign Application Priority Data
Feb. 24, 2012 (EP) .................................... 12156979

(51) Int. Cl.
*B29C 43/14* (2006.01)
*B30B 15/02* (2006.01)
(Continued)

(52) U.S. Cl.
CPC .......... *B29C 43/146* (2013.01); *B29C 43/003* (2013.01); *B29C 43/203* (2013.01);
(Continued)

(58) Field of Classification Search
None
See application file for complete search history.

(56) References Cited

U.S. PATENT DOCUMENTS 3,255,278 A * 6/1966 Smith .................... B30B 11/34
264/0.5
3,840,631 A * 10/1974 Alexander, Jr. ......... B30B 11/34
264/113
(Continued)

FOREIGN PATENT DOCUMENTS

EP    1 837 278    9/2007
GB    2 081 851    2/1982
(Continued)

OTHER PUBLICATIONS

International Search Report Issued Aug. 30, 2013 in PCT/EP13/053467 Filed Feb. 21, 2013.
(Continued)

*Primary Examiner* — Mary F Theisen
(74) *Attorney, Agent, or Firm* — Oblon, McClelland, Maier & Neustadt, L.L.P.

(57) ABSTRACT

A method of making a multilayer article includes providing a mold defining a first cavity with a removable element therein; placing a first particulate component in the cavity; compressing the component along a first axis in a first compression step to form a first layer of the article; removing the element from the cavity after formation of the first layer; placing one or more additional particulate components in the mold; compressing the one or more additional particulate components along the first axis in one or more additional compression steps after removal of the element to form one or more additional layers of the article, wherein the first layer meets one of the one or more additional layers along a first interface substantially parallel to the first axis and the first layer meets one of the one or more additional layers along a second interface substantially perpendicular to the first axis.

14 Claims, 2 Drawing Sheets

(51) Int. Cl.
*A24F 47/00* (2006.01)
*B30B 11/02* (2006.01)
*F42B 33/02* (2006.01)
*B29C 43/00* (2006.01)
*B29C 43/20* (2006.01)
*B29K 1/00* (2006.01)
*B29K 105/00* (2006.01)

(52) U.S. Cl.
CPC ............ *B30B 11/027* (2013.01); *B30B 15/02* (2013.01); *F42B 33/025* (2013.01); *A24F 47/004* (2013.01); *B29C 2043/147* (2013.01); *B29K 2001/08* (2013.01); *B29K 2105/251* (2013.01)

(56) References Cited

U.S. PATENT DOCUMENTS

| | | | | |
|---|---|---|---|---|
| 4,419,413 A | * | 12/1983 | Ebihara | B22F 3/03 164/412 |
| 4,436,033 A | | 3/1984 | Precoul | |
| 4,887,410 A | | 12/1989 | Gandini | |
| 4,996,014 A | * | 2/1991 | Suvanto | B22F 3/02 264/113 |
| 5,043,123 A | * | 8/1991 | Gormanns | B22F 3/03 264/113 |
| 5,221,503 A | * | 6/1993 | Ward | B30B 11/04 264/104 |
| 5,246,018 A | * | 9/1993 | Deevi | A24F 47/004 131/194 |
| 2003/0160353 A1 | | 8/2003 | Robinson et al. | |
| 2007/0224144 A1 | | 9/2007 | Lazzarini et al. | |

FOREIGN PATENT DOCUMENTS

| | | |
|---|---|---|
| JP | 62-201812 | 9/1987 |
| JP | 9-324204 A | 12/1997 |
| JP | 2003-260596 | 9/2003 |
| JP | 2005-95979 A | 4/2005 |
| JP | 2008-280251 A | 11/2008 |
| JP | 2009-529872 A | 8/2009 |

OTHER PUBLICATIONS

Written Opinion of the International Searching Authority Issued Aug. 30, 2013 in PCT/EP13/053467 Filed Feb. 21, 2013.
Notice of Submission of Information issued Feb. 26, 2016 in Japanese Patent Application No. 2014-558101.

* cited by examiner

METHOD OF MAKING A MULTILAYER ARTICLE

CROSS REFERENCE TO RELATED APPLICATION

This application is a national phase application based on PCT/EP2013/053467, filed on Feb. 21, 2013.

The present invention relates to a method of making a multilayer article.

Multilayer articles are known in the art and used in a number of fields such as the pharmaceutical, detergent, ceramics and explosives industries. Depending on their intended use, known multilayer articles may comprise a plurality of layers having different compositions, different physical properties or a combination thereof.

Multilayer articles may be formed from particulate materials by pressing or extrusion. Typically, pressing is used to form multilayer articles comprising a plurality of transverse layers In such multilayer articles, the plurality of transverse layers meet one another along parallel interfaces that extend across the width of the multilayer article.

Typically, extrusion is used to form multilayer articles having a plurality of longitudinal layers. In such multilayer articles, the plurality of longitudinal layers meet one another along parallel interfaces that extend along the length of the multilayer article.

It would be desirable to provide a method of making multilayer articles that comprise a mixture of transverse layers and longitudinal layers from particulate materials.

According to the invention there is provided a method of making a multilayer article. The method comprises: providing a mould defining a first mould cavity, wherein the mould comprises a removable element within the first mould cavity; placing a first particulate component in the first mould cavity; compressing the first particulate component along a first axis in a first compression step to form a first layer of the multilayer article by applying a first compression force to the first particulate component; removing the removable element from the first mould cavity after formation of the first layer; placing one or more additional particulate components in the mould wherein a portion of the one or more additional particulate components occupies a space formerly occupied by the removable element; compressing the one or more additional particulate components along the first axis in one or more additional compression steps after removal of the removable element to form one or more additional layers of the multilayer article, wherein the first layer meets one of the one or more additional layers along a first interface substantially parallel to the first axis and the first layer meets one of the one or more additional layers along a second interface substantially perpendicular to the first axis; and removing the multilayer article from the mould. The one or more additional compression steps comprise applying a compression force to the one or more additional particulate components prior to removing the multilayer article from the mould that is greater than the first compression force applied to the first particulate component to form the first layer.

As used herein, the term 'particulate component' is used to describe any flowable particulate material or combination of particulate materials including, but not limited to, powders and granules. Particulate components used in methods according to the invention may comprise two or more particulate materials of different types. Alternatively or in addition, particulate components used in methods according to the invention may comprise two or more particulate materials of different composition.

As used herein, the term 'different composition' is used to refer to materials, components or layers formed from different compounds, or from a different combination of compounds, or from a different formulation of the same combination of compounds.

As used herein, the terms 'layer' and 'layers' are used to refer to distinct portions of multilayer articles made by methods according to the invention that meet one another along interfaces. Use of the terms 'layer' and 'layers' is not limited to distinct portions of multilayer articles made by methods according to the invention having any particular absolute or relative dimensions. In particular, layers of multilayer articles made by methods according to the invention may be laminar or non-laminar.

Different layers of multilayer articles made by methods according to the invention may have the same or different compositions. Alternatively or in addition, different layers of multilayer articles made by methods according to the invention may have the same or different physical properties. For example, different layers of multilayer articles made by methods according to the invention may have different densities.

Different layers of multilayer articles made by methods according to the invention may have the same or different dimensions.

In accordance with the invention, the first layer of the multilayer article is formed by compressing the first particulate component in a first compression step and the one or more additional layers of the multilayer article are formed by compressing one or more additional particulate components in one or more subsequent compression steps.

The first compression step comprises applying a first compression force to the first particulate component. The one or more additional compression steps comprise applying a compression force to the one or more additional particulate components prior to removing the multilayer article from the mould that is greater than the first compression force applied to the first particulate component.

The methods of the invention may advantageously be used to make free-standing, self-supporting multilayer articles. Applying a compression force to the one or more additional particulate components prior to removing the multilayer article from the mould that is greater than the first compression force applied to the first particulate component to form the first layer advantageously facilitates the manufacture of free-standing, self-supporting multilayer articles using methods according to the invention.

As described in more detail below, by removing the removable element from the first mould cavity between the first compression step used to form the first layer and the one or more subsequent compression steps used to form the one or more additional layers, the method of the invention advantageously allows multilayer articles to be made that comprise orthogonal layers.

As used herein, the term 'orthogonal layers' is used to indicate that a first interface between the first layer of the multilayer article and one of the one or more additional layers of the multilayer article is substantially perpendicular to a second interface between the first layer of the multilayer article and one of the one or more additional layers of the multilayer article.

In certain embodiments, methods according to the invention may be used to make elongate multilayer articles. In such embodiments, the first axis may correspond to a longitudinal axis of the multilayer article or a transverse axis of the multilayer article.

As used herein, the term 'transverse layers' is used to refer to layers than meet along an interface that extends across the width of elongate multilayer articles made by methods according to the invention.

As used herein, the term 'longitudinal layers' is used to refer to layers than meet along an interface that extends along the length of elongate multilayer articles made by methods according to the invention.

The method may comprise providing a mould defining a first mould cavity having a cross-section of any suitable shape perpendicular to the first axis.

For example, where methods according to the invention are used to make elongate multilayer articles and the first axis corresponds to a longitudinal axis of the multilayer article, the first mould cavity may be of substantially circular, triangular, square, rhomboidal, trapezoidal or octagonal transverse cross-section.

The method may comprise providing a mould comprising a removable element having a cross-section of any suitable shape perpendicular to the first axis.

For example, where methods according to the invention are used to make elongate multilayer articles and the first axis corresponds to a longitudinal axis of the multilayer article, the removable element may be of substantially circular, triangular, square, rhomboidal, trapezoidal or octagonal transverse cross-section.

In certain preferred embodiments, the first axis corresponds to a longitudinal axis of the multilayer article and the first mould cavity and the removable element are of substantially circular transverse cross-section.

Methods according to the invention comprise: compressing the first particulate component along the first axis in the first compression to form the first layer of the multilayer article by applying a first compression force to the first particulate component.

Removal of the removable element from the first mould cavity after formation of the first layer of the multilayer article creates a second mould cavity defined by a portion of the mould and a portion of the first layer.

In certain embodiments, the method comprises: removing the removable element from the first mould cavity after formation of the first layer; placing a second particulate component in a second mould cavity defined by a portion of the mould and a portion of the first layer; compressing the second particulate component along the first axis in a second compression step to form a second layer of the multilayer article, wherein the first layer meets the second layer along a first interface substantially parallel to the first axis and the first layer meets the second layer along a second interface substantially perpendicular to the first axis.

In such embodiments, the method comprises: compressing the first particulate component along the first axis in the first compression step to form the first layer of the multilayer article by applying a first compression force to the first particulate component; and compressing the second particulate component along the first axis in a second compression to form the second layer by applying a second compression force to the second particulate component.

In such embodiments, the second compression force applied to the second particulate component to form the second layer is greater than the first compression force applied to the first particulate component to form the first layer.

In other embodiments, the method comprises: compressing the one or more additional particulate components along the first axis in one or more additional compression steps after removal of the removable element to form a second layer of the multilayer article and a third layer of the multilayer article, wherein the first layer meets the second layer along a first interface substantially parallel to the first axis and the first layer meets the third layer along a second interface substantially perpendicular to the first axis.

In such embodiments, the first layer and the second layer may be transverse layers and the third layer may be a longitudinal layer.

Alternatively, the first layer and the second layer may be longitudinal layers and the third layer may be a transverse layer.

The second layer of the multilayer article and the third layer of the multilayer article may be formed simultaneously in a single additional compression step.

For example, in certain embodiments the method may comprise: removing the removable element from the first mould cavity after formation of the first layer; placing a second particulate component in a second mould cavity defined by a portion of the mould and a portion of the first layer; placing a third particulate component in a third mould cavity defined by a portion of the mould, a portion of the first layer and a portion of the second particulate component; and compressing the second particulate component along the first axis to form the second layer of the multilayer article and compressing the third particulate component along the first axis to form the third layer of the multilayer article simultaneously in a second compression step.

In such embodiments, the method comprises: compressing the first particulate component along the first axis in the first compression step to form the first layer of the multilayer article by applying a first compression force to the first particulate component; and compressing the second particulate component along the first axis to form the second layer of the multilayer article and compressing the third particulate component along the first axis to form the third layer of the multilayer article simultaneously in a second compression step by applying a second compression force to the third particulate component.

In such embodiments, the second compression force applied to the third particulate component to form the second layer and the third layer is greater than the first compression force applied to the first particulate component to form the first layer.

Alternatively, the second layer of the multilayer article and the third layer of the multilayer article may be formed in two separate additional compression steps.

In certain embodiments, the method comprises: removing the removable element from the first mould cavity after formation of the first layer; placing a second particulate component in a second mould cavity defined by a portion of the mould and a portion of the first layer; compressing the second particulate component along the first axis in a second compression step to form the second layer of the multilayer article; placing a third particulate component in a third mould cavity defined by a portion of the mould, a portion of the first layer and a portion of the second layer; and compressing the third particulate component along the first axis in a third compression step to form the third layer of the multilayer article.

In certain preferred embodiments, the method comprises: placing the first particulate component around the removable element in the first mould cavity; compressing the first particulate component along the first axis in the first compression step to form an outer first layer of the multilayer article circumscribing the removable element; removing the removable element from the first mould cavity after formation of the outer first layer; placing the second particulate component in a second mould cavity defined by a portion of the mould and an inner surface of the outer first layer; compressing the second particulate component along the first axis to form an inner second layer of the multilayer article circumscribed by the outer first layer; placing a third particulate component in a third mould cavity defined by a portion of the mould, a portion of the outer first layer and a portion of the inner second layer; and compressing the third particulate component along the first axis in the third compression step to form the third layer of the multilayer article.

In certain preferred embodiments, the method comprises: placing the first particulate component around the removable element in the first mould cavity; compressing the first particulate component along the first axis to form an annular outer first layer of the multilayer article circumscribing the removable element; removing the removable element from the first mould cavity after formation of the annular outer first layer; placing the second particulate component in a second mould cavity defined by a portion of the mould and an inner annular surface of the annular outer first layer; compressing the second particulate component along the first axis to form an inner second layer of the multilayer article circumscribed by the annular outer first layer; placing a third particulate component in a third mould cavity defined by a portion of the mould, a portion of the annular outer first layer and a portion of the inner second layer; and compressing the third particulate component along the first axis in the third compression step to form the third layer of the multilayer article.

In certain particularly preferred embodiments, the method comprises: providing a mould defining a substantially cylindrical first mould cavity, wherein the mould comprises a substantially cylindrical removable element within the substantially cylindrical first mould cavity; placing the first particulate component around the substantially cylindrical removable element in the substantially cylindrical first mould cavity; compressing the first particulate component along the first axis to form a substantially cylindrical annular outer first layer of the multilayer article circumscribing the substantially cylindrical removable element; removing the substantially cylindrical removable element from the substantially cylindrical first mould cavity after formation of the substantially cylindrical annular outer first layer; placing the second particulate component in a substantially cylindrical second mould cavity defined by a portion of the mould and an inner annular surface of the substantially cylindrical annular outer first layer; compressing the second particulate component along the first axis to form a substantially cylindrical second layer of the multilayer article circumscribed by the substantially cylindrical annular first layer; placing the third particulate component in a third mould cavity defined by a portion of the mould, a portion of the substantially cylindrical annular outer first layer and a portion of the substantially cylindrical inner second layer; and compressing the third particulate component along the first axis in the third compression step to form the third layer of the multilayer article.

In such particularly preferred embodiments, the method preferably comprises: compressing the second particulate component along the first axis to form a substantially cylindrical inner second layer of reduced height compared to the substantially cylindrical annular outer first layer; placing the third particulate component in a third mould cavity defined by a portion of the mould, an inner annular surface and end face of the substantially cylindrical annular outer first layer and an end face of the substantially cylindrical inner second layer; and compressing the third particulate component along the first axis to form the third layer of the multilayer article. In such embodiments, the reduced height of the substantially cylindrical inner second layer compared to the substantially cylindrical annular outer first layer results in a stepped interface between the third layer and the substantially cylindrical annular outer first layer and the substantially cylindrical inner second layer of the multilayer article. This advantageously increases the mechanical integrity of the formed multilayer article.

Methods according to the invention comprise: compressing the first particulate component along the first axis in the first compression to form the first layer of the multilayer article by applying a first compression force to the first particulate component.

In embodiments where the second layer of the multilayer article and the third layer of the multilayer article are formed in two separate additional compression steps, the method comprises: compressing the first particulate component along the first axis in the first compression step to form the first layer of the multilayer article by applying a first compression force to the first particulate component; compressing the second particulate component along the first axis in the second compression step to form the second layer of the multilayer article by applying a second compression force to the second particulate component; and compressing the third particulate component along the first axis in the third compression step to form the third layer by applying a third compression force to the third particulate component.

In such embodiments, the second compression force applied to the second particulate component to form the second layer may be the same as or different from the first compression force applied to the first particulate component to form the first layer. In such embodiments, the third compression force applied to the third particulate component to form the third layer is greater than the first compression force applied to the first particulate component to form the first layer and the second compression force applied to the second particulate component to form the second layer.

Methods according to the invention may comprise applying a compression force to one or more of the first particulate component, second particulate component and, where present third particulate component using any suitable known means. For example, methods according to the invention may comprise applying a compression force to one or more of the first particulate component, second particulate component and, where present third particulate component using a punch.

Methods according to the invention may comprise removing the multilayer article from the mould using any suitable known means. For example, methods according to the invention may comprise removing the multilayer article from the mould using a punch.

Methods according to the invention may be used to make multilayer articles for use in a variety of industries including, but not limited to, the pharmaceutical, detergent, ceramics and explosives industries.

A number of smoking articles in which tobacco is heated rather than combusted have been proposed in the art. One aim of such 'heated' smoking articles is to reduce known harmful smoke constituents of the type produced by the combustion and pyrolytic degradation of tobacco in conventional cigarettes. In one known type of heated smoking article, an aerosol is generated by the transfer of heat from a combustible heat source to an aerosol-forming substrate located downstream of the combustible carbonaceous heat source. During smoking, volatile compounds are released from the aerosol-forming substrate by heat transfer from the combustible heat source and entrained in air drawn through the smoking article. As the released compounds cool, they condense to form an aerosol that is inhaled by the user.

Methods according to the invention may advantageously be used to make multilayer combustible heat sources for smoking articles of the type described above. In particular, methods according to the invention may be advantageously used to make multilayer combustible carbonaceous heat sources for smoking articles.

As used herein, the term 'carbonaceous' is used to describe heat sources and particulate components comprising carbon.

Through an appropriate choice of the shape and dimensions of the first mould cavity defined by the mould, methods according to the invention may be advantageously used to make multilayer articles having different desired shapes and dimensions.

Where methods according to the invention are used to make combustible heat sources for smoking articles, the first mould cavity is preferably substantially cylindrical, more preferably substantially cylindrical with a substantially circular cross-section, most preferably substantially cylindrical with a substantially circular cross-section and a diameter of between about 5 mm and about 10 mm.

Through an appropriate choice of the shape, dimensions and position of the removable element within the first mould cavity, methods according to the invention may be advantageously used to make multilayer articles comprising first layers and second layers having different desired shapes, dimensions and relative positions.

Where methods according to the invention are used to make combustible heat sources for smoking articles, the removable element is preferably substantially cylindrical, more preferably substantially cylindrical with a substantially circular cross-section, most preferably substantially cylindrical with a substantially circular cross-section and a diameter of between about 0.5 mm and about 6.5 mm.

The first particulate component, the second particulate component and, where present, the third particulate component may have the same or different compositions. Preferably, the first particulate component and the second particulate component have different compositions.

Alternatively or in addition, the first particulate component, the second particulate component and, where present, the third particulate component may have the same or different physical properties. For example, the first particulate component, the second particulate component and, where present, the third particulate component may have the same or different densities or particle sizes.

Through an appropriate choice of the composition and physical properties of the first particulate component, the second particulate component and, where present, the third particulate component, methods according to the invention may be advantageously used to make multilayer articles comprising first layers, second layers and, where present, third layers having different desired properties. For example, methods according to the invention may be advantageously used to make multilayer articles comprising first layers, second layers and, where present, third layers having different chemical, electrical, magnetic, and physical properties.

Where methods according to the invention are used to make combustible carbonaceous heat sources for smoking articles, one or more of the first particulate component, the second particulate component and, where present, the third particulate component may be carbonaceous. In certain preferred embodiments, the first particulate component, the second particulate component and, where present, the third particulate component are carbonaceous.

In other preferred embodiments, the first particulate component is carbonaceous and one or both of the second particulate component and, where present, the third particulate component are non-carbonaceous.

In embodiments where the first particulate component is carbonaceous, the first particulate component preferably has a carbon content of at least about 35 percent, more preferably of at least about 45 percent, most preferably of at least about 55 percent by dry weight of the first particulate component. In certain preferred embodiments, the first particulate component preferably has a carbon content of at least about 65 percent by dry weight of the first particulate component.

In embodiments where the second particulate component is carbonaceous, the second particulate component preferably has a carbon content of less than or equal to about 55 percent, more preferably of less than or equal to about 45 percent, most preferably of less than or equal to about 35 percent by dry weight. In certain preferred embodiments, the second particulate component preferably has a carbon content of less than about 25 percent by dry weight.

In embodiments where the third particulate component is carbonaceous, the third particulate component preferably has a carbon content of less than or equal to about 55 percent, more preferably of less than or equal to about 45 percent, most preferably of less than or equal to about 35 percent by dry weight. In certain preferred embodiments, the third particulate component preferably has a carbon content of less than or equal to about 25 percent by dry weight.

Carbonaceous particulate components for use in methods according to the invention for making multilayer combustible carbonaceous heat sources may be formed from one or more suitable carbon-containing materials.

If desired, one or more binders may be combined with the one or more carbon-containing materials. Preferably, the one or more binders are organic binders. Suitable known organic binders, include but are not limited to, gums (for example, guar gum), modified celluloses and cellulose derivatives (for example, methyl cellulose, carboxymethyl cellulose, hydroxypropyl cellulose and hydroxypropyl methylcellulose) flour, starches, sugars, vegetable oils and combinations thereof.

Instead of, or in addition to one or more binders, carbonaceous particulate components for use in methods according to the invention for making multilayer combustible carbonaceous heat sources may comprise one or more additives in order to improve the properties of the combustible carbonaceous heat source. Suitable additives include, but are not limited to, additives to promote consolidation of the combustible carbonaceous heat source (for example, sintering aids), additives to promote ignition of the combustible carbonaceous heat source (for example, oxidisers such as perchlorates, chlorates, nitrates, peroxides, permanganates, zirconium and combinations thereof), additives to promote combustion of the combustible carbonaceous heat source (for example, potassium and potassium salts, such as potassium citrate) and additives to promote decomposition of one or more gases produced by combustion of the combustible carbonaceous heat source (for example catalysts, such as CuO, $Fe_2O_3$ and $Al_2O_3$).

Where methods according to the invention are used to make combustible carbonaceous heat sources for smoking articles, at least one of the particulate components comprises carbon. Preferably, at least one of the particulate components comprises an ignition aid. In certain embodiments, at least one of the particulate components may comprise carbon and an ignition aid.

In embodiments where the first particulate component comprises an ignition aid, the first particulate component preferably has an ignition aid content of less than or equal to about 60 percent, more preferably of less than or equal to about 50 percent, most preferably of less than or equal to about 40 percent by dry weight. In certain preferred embodiments, the first particulate component preferably has an ignition aid content of less than or equal to about 30 percent by dry weight.

In embodiments where the second particulate component comprises an ignition aid, the second particulate component preferably has an ignition aid content of at least about 35 percent, more preferably of at least about 45 percent, most preferably of at least about 55 percent by dry weight. In certain preferred embodiments, the second particulate component preferably has an ignition aid content of at least about 65 percent by dry weight.

In embodiments where the third particulate component comprises at least one ignition aid, the third particulate component preferably has an ignition aid content of at least about 30 percent, more preferably of at least about 40 percent, most preferably of at least about 50 percent by dry weight.

As used herein, the term 'ignition aid' is used to denote a material that releases one or both of energy and oxygen during ignition of the combustible heat source, where the rate of release of one or both of energy and oxygen by the material is not ambient oxygen diffusion limited. In other words, the rate of release of one or both of energy and oxygen by the material during ignition of the combustible heat source is largely independent of the rate at which ambient oxygen can reach the material. As used herein, the term 'ignition aid' is also used to denote an elemental metal that releases energy during ignition of the combustible heat source, wherein the ignition temperature of the elemental metal is below about 500° C. and the heat of combustion of the elemental metal is at least about 5 kJ/g.

As used herein, the term 'ignition aid' does not include alkali metal salts of carboxylic acids (such as alkali metal citrate salts, alkali metal acetate salts and alkali metal succinate salts), alkali metal halide salts (such as alkali metal chloride salts), alkali metal carbonate salts or alkali metal phosphate salts, which are believed to modify carbon combustion. Even when present in a large amount relative to the total weight of the combustible heat source, such alkali metal burn salts do not release enough energy during ignition of a combustible heat source to produce an acceptable aerosol during early puffs.

Examples of suitable oxidizing agents include, but are not limited to: nitrates such as, for example, potassium nitrate, calcium nitrate, strontium nitrate, sodium nitrate, barium nitrate, lithium nitrate, aluminium nitrate and iron nitrate; nitrites; other organic and inorganic nitro compounds; chlorates such as, for example, sodium chlorate and potassium chlorate; perchlorates such as, for example, sodium perchlorate; chlorites; bromates such as, for example, sodium bromate and potassium bromate; perbromates; bromites; borates such as, for example, sodium borate and potassium borate; ferrates such as, for example, barium ferrate; ferrites; manganates such as, for example, potassium manganate; permanganates such as, for example, potassium permanganate; organic peroxides such as, for example, benzoyl peroxide and acetone peroxide; inorganic peroxides such as, for example, hydrogen peroxide, strontium peroxide, magnesium peroxide, calcium peroxide, barium peroxide, zinc peroxide and lithium peroxide; superoxides such as, for example, potassium superoxide and sodium superoxide; iodates; periodates; iodites; sulphates; sulfites; other sulfoxides; phosphates; phospinates; phosphites; and phosphanites.

Preferably, multilayer combustible heat sources made by methods according to the invention have an apparent density of between about 0.6 g/cm$^3$ and about 1 g/cm$^3$.

Preferably, multilayer combustible heat sources made by methods according to the invention have a length of between about 5 mm and about 20 mm, more preferably of between about 7 mm and about 15 mm, most preferably of between about 7 mm and about 13 mm.

Preferably, multilayer combustible heat sources made by methods according to the invention have a diameter of between about 5 mm and about 10 mm, more preferably of between about 7 mm and about 8 mm.

Preferably, multilayer combustible heat sources made by methods according to the invention are of substantially uniform diameter. However, methods according to the invention may be used to make multilayer combustible heat sources that are tapered such that the diameter of a first end of the combustible heat source is greater than the diameter of an opposed second thereof.

Preferably, multilayer combustible heat sources made by methods according to the invention are substantially cylindrical. For example, methods according to the invention may be used to make cylindrical multilayer combustible heat sources of substantially circular cross-section or of substantially elliptical cross-section.

The invention will be further described, by way of example only, with reference to the accompanying drawings in which.

The method shown in FIG. 1 comprises sequential steps which are labeled a) to i) in FIG. 1 and described in detail below.

Step a) of the preferred method comprises providing a mould 2 defining a substantially cylindrical first mould cavity 4 of substantially circular cross-section, wherein the mould comprises a substantially cylindrical removable element 6 of substantially circular cross-section within the substantially cylindrical first mould cavity 4. As shown in FIG. 1, the mould 2 and first mould cavity 4 have an open upper end and the substantially cylindrical removable element 6 is located substantially centrally within the substantially cylindrical first mould cavity 4.

Step b) of the preferred method comprises placing a first particulate component 8 around the substantially cylindrical removable element 6 in the substantially cylindrical first mould cavity 4.

Where the multilayer article is intended for use as a combustible heat source for a smoking article, preferably the first particulate component 8 is carbonaceous. More preferably, the first particulate component 8 comprises carbon and at least one ignition aid.

Step c) of the preferred method comprises compressing the first particulate component 8 in a downward direction (shown by a solid arrow in FIG. 1) to form a substantially cylindrical annular outer first layer 12 of the multilayer article by applying a first compression force to the first particulate component 8 in the downward direction using an annular punch 10.

Step d) of the preferred method comprises removing the substantially cylindrical removable element 6 from the substantially cylindrical first mould cavity 4 after formation of the substantially cylindrical annular outer first layer 12. As shown in FIG. 1, this creates a substantially cylindrical second mould cavity 14 defined by a base portion 16 of the mould 2 and the annular inner surface 18 of the substantially cylindrical annular outer first layer 12.

Step e) of the preferred method comprises placing a second particulate component 20 in the second mould cavity 14. Depending on the intended use and desired properties of the multi-layer article, the composition of the second particulate component 20 may be the same as or different from the composition of the first particulate component 8. Alternatively or in addition, the physical properties of the second particulate component 20 may be the same as or different from the physical properties of the first particulate component 8.

Where the multilayer article is intended for use as a combustible heat source for a smoking article, preferably the second particulate component 20 is carbonaceous. More preferably, the second particulate component 20 comprises carbon and at least one ignition aid.

Step f) of the preferred method comprises compressing the second particulate component 20 in a downward direction (shown by a solid arrow in FIG. 1) to form a substantially cylindrical inner second layer 24 of the multilayer article by applying a second compression force to the second particulate component 20 in the downward direction using a substantially cylindrical punch 22. As shown in FIG. 1, the substantially cylindrical inner second layer 24 is circumscribed by the substantially cylindrical annular outer first layer 12 and is of reduced height compared to the substantially cylindrical annular inner first layer 12.

Depending on the composition and properties of the second particulate component 20 and the intended use and desired properties of the multi-layer article, the second compression force used to form the substantially cylindrical inner second layer 24 may be the same as or different to the first compression force used to form the substantially cylindrical annular outer first layer 12.

Figure 1:
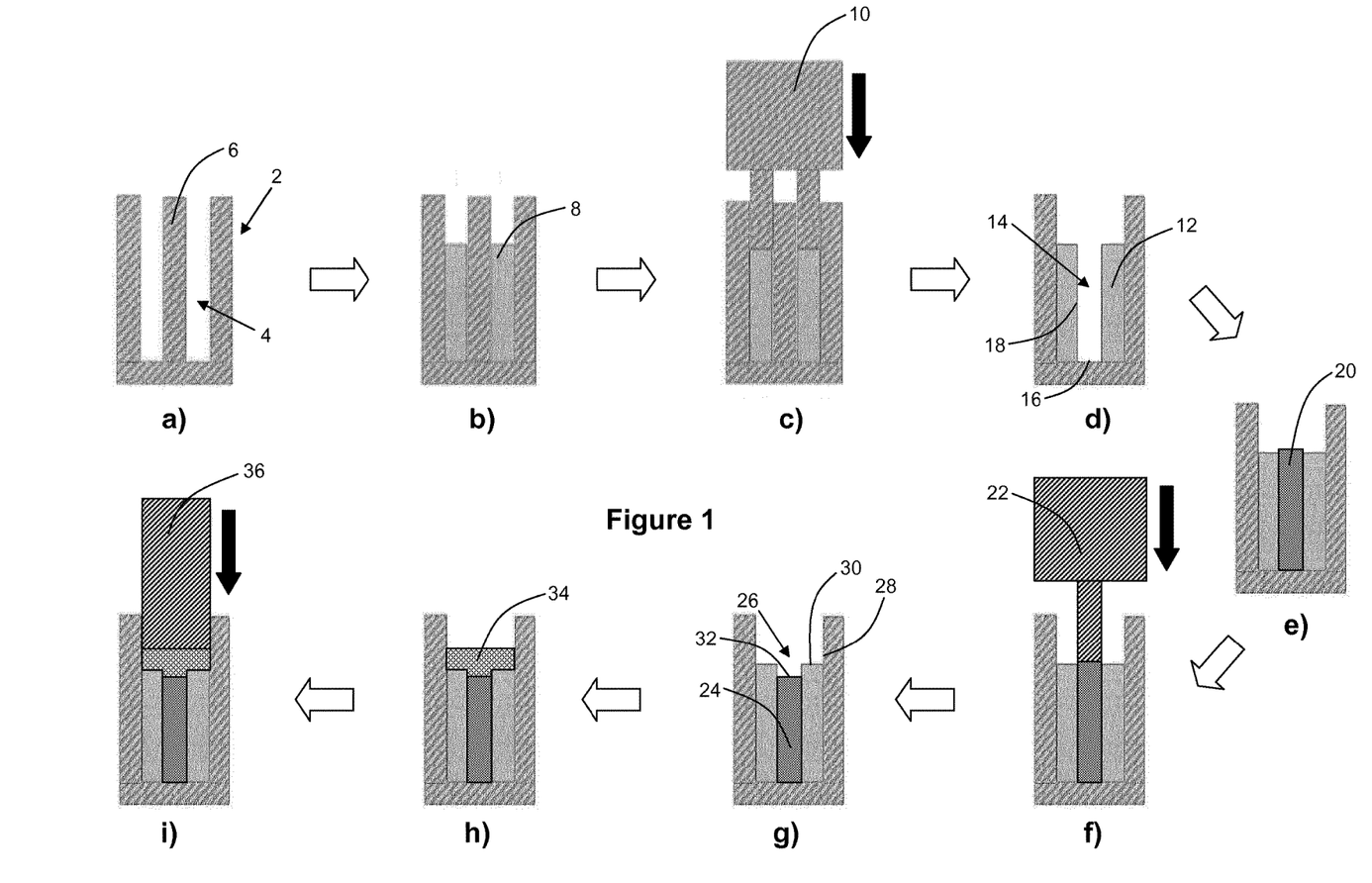
FIG. 1 is a flowchart illustrating a method for making a multilayer article according to one preferred embodiment of the invention.

In the preferred method shown in FIG. 1, the second compression force is applied to the second particulate component 20. However, it will be appreciated that in an alternative embodiment of the invention (not shown) step f) may comprise compressing the second particulate component 20 in the downward direction to form the substantially cylindrical second layer 24 of the multilayer article by applying a second compression force to both the substantially cylindrical annular outer first layer 12 and the second particulate component 20 in the downward direction.

As shown in step g) of FIG. 1, compression of the second particulate component 20 to form the substantially cylindrical inner second layer 24 creates a third mould cavity 26 defined by a side portion 28 of the mould 2, an upper portion of the inner annular surface 18 and the upper end face 30 of the substantially cylindrical annular outer first layer 12 and the upper end face 32 of the substantially cylindrical inner second layer 24.

Step h) of the preferred method comprises placing a third particulate component 34 in the third mould cavity 26. Depending on the intended use and desired properties of the multi-layer article, the composition of the third particulate component 34 may be the same as or different from the composition of one or both of the first particulate component 8 and the second particulate component 20. Alternatively or in addition, the physical properties of the third particulate component 34 may be the same as or different from the physical properties of one or both of the first particulate component 8 and the second particulate component 20.

Where the multilayer article is intended for use as a combustible heat source for a smoking article, preferably the third particulate component 34 is carbonaceous. More preferably, the third particulate component 34 comprises carbon and at least one ignition aid.

Step i) of the preferred method comprises compressing the third particulate component 34 in a downward direction (shown by a solid arrow in FIG. 1) to form a third layer 38 of the multilayer article by applying a third compression force to the third particulate component 34 in the downward direction using a substantially cylindrical punch 36.

As shown in FIG. 1, the reduced height of the substantially cylindrical inner second layer 24 compared to the substantially cylindrical annular outer first layer 12 results in a stepped interface between the third layer 38 and the substantially cylindrical annular outer first layer 12 and the substantially cylindrical inner second layer 24 of the multilayer article. This advantageously increases the mechanical integrity of the formed multilayer article.

The third compression force used to form the third layer 38 is greater than the first compression force used to form the substantially cylindrical annular first layer 12 and the second compression force used to form the substantially cylindrical second layer 24.

In the preferred method shown in FIG. 1, the third particulate component 34 is placed in the mould 2 after formation of the second layer 24. However, it will be appreciated that in an alternative embodiment of the invention (not shown) step e) may comprise placing both the second particulate component 20 and the third particulate component 34 in the mould 2 and step f) may comprise simultaneously compressing the third particulate component 34 and the second particulate component 20 in the downward direction to form the third layer 38 of the multilayer article and the substantially cylindrical inner second layer 24 of the multilayer article, respectively, by applying a second compression force to the third particulate component 34 in the downward direction. Steps g), h) and i) may then be omitted. In this alternative embodiment, the second compression force used to form the third layer 38 and the substantially cylindrical second layer 24 is greater than the first compression force used to form the substantially cylindrical annular first layer 12.

Figure 2:
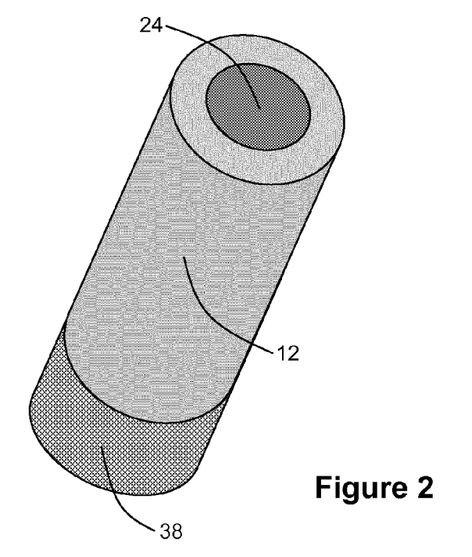
FIG. 2 is a perspective view of a multilayer article formed by the method illustrated in FIG. 1.

After formation of the third layer 38 in step i), the formed multilayer article may be ejected from the first mould cavity 4 of the mould 2 in any suitable known manner. FIG. 2 shows a perspective view of the formed free-standing, self-supporting multilayer article after ejection from the mould.

EXAMPLE 1

Figure 3:
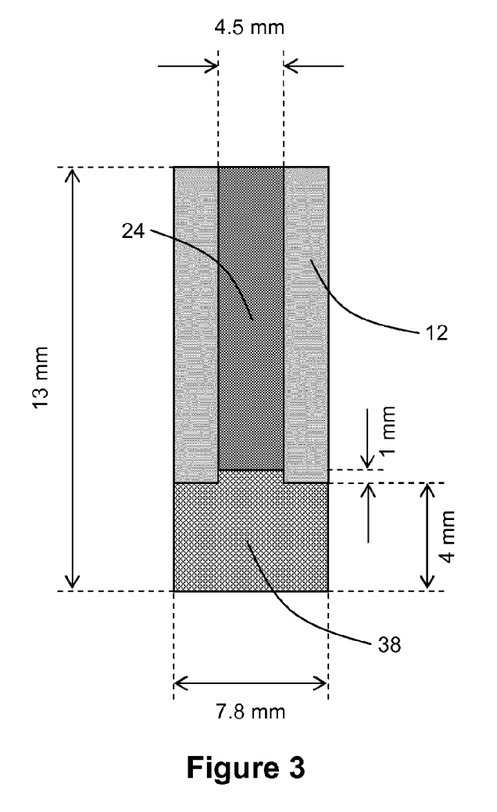
FIG. 3 is a longitudinal cross-section of a multilayer combustible heat source formed by the method illustrated in FIG. 1 as described in Example 1.

A multilayer combustible heat source for a smoking article having the dimensions shown in FIG. 3 is made using the method shown in FIG. 1. The layers of the multilayer combustible heat source are made using the particulate components and compression forces shown in Table 1.

TABLE 1

|  | First Particulate Component | Second Particulate Component | Third Particulate Component |
|---|---|---|---|
| Mass (mg) | 400 | 150 | 245 |
| Carbon (% by dry weight) | 65 | 45 | 35 |
| Carboxymethyl cellulose (% by dry weight) | 5 | 5 | 5 |
| Calcium peroxide (% by dry weight) | 30 | 50 | 60 |
| First compression force (kg) | 2 | — | — |
| Second compression force (kg) | — | 3 | — |
| Third compression force (kg) | — | — | ~20 |

The embodiments and example described above illustrate but do not limit the invention. Other embodiments of the invention may be made without departing from the spirit and scope thereof, and it is to be understood that the specific embodiments described herein are not limiting.

In particular, while the invention has been exemplified above with reference to the formation of a multilayer combustible heat source for a smoking article, it will be appreciated that methods according to the invention may be used to make other multilayer articles including, but not limited to, multilayer articles for use in the pharmaceutical, detergent, ceramics and explosives industries.

The invention claimed is:

1. A method of making a free-standing, self-supporting multilayer article, comprising:
   providing a mould defining a first mould cavity, wherein the mould comprises a removable element within the first mould cavity;
   placing a first particulate component in the first mould cavity;
   compressing the first particulate component along a first axis in a first compression step to form a first layer of the free-standing, self-supporting multilayer article by applying a first compression force to the first particulate component;
   removing the removable element from the first mould cavity after formation of the first layer;
   placing one or more additional particulate components in the mould, wherein a portion of the one or more additional particulate components occupies a space formerly occupied by the removable element;
   compressing the one or more additional particulate components along the first axis in one or more additional compression steps after removal of the removable element to form one or more additional layers of the free-standing, self-supporting multilayer article, wherein the first layer meets one of the one or more additional layers along a first interface substantially parallel to the first axis and the first layer meets one of the one or more additional layers along a second interface substantially perpendicular to the first axis; and
   removing the free-standing, self-supporting multilayer article from the mould,
   wherein the one or more additional compression steps comprise applying a compression force to the one or more additional particulate components prior to removing the free-standing, self-supporting multilayer article from the mould that is greater than the first compression force applied to the first particulate component to form the first layer.

2. The method according to claim 1, further comprising:
   compressing the one or more additional particulate components along the first axis in one or more additional compression steps after removal of the removable element to form a second layer of the free-standing, self-supporting multilayer article and a third layer of the free-standing, self-supporting multilayer article, wherein the first layer meets the second layer along a first interface substantially parallel to the first axis and the first layer meets the third layer along a second interface substantially perpendicular to the first axis.

3. The method according to claim 2, further comprising:
   removing the removable element from the first mould cavity after formation of the first layer;
   placing a second particulate component in a second mould cavity defined by a portion of the mould and a portion of the first layer;
   compressing the second particulate component along the first axis in a second compression step to form the second layer of the free-standing, self-supporting multilayer article by applying a second compression force;
   placing a third particulate component in a third mould cavity defined by a portion of the mould, a portion of the first layer and a portion of the second layer; and
   compressing the third particulate component along the first axis in a third compression step to form the third layer of the free-standing, self-supporting multilayer article by applying a third compression force,
   wherein the third compression force applied to the third particulate component to form the third layer is greater than the first compression force applied to the first particulate component to form the first layer and the second compression force applied to the second particulate component to form the second layer.

4. The method according to claim 3, further comprising:
   placing the first particulate component around the removable element in the first mould cavity;
   compressing the first particulate component along the first axis in the first compression step to form an outer first layer of the free-standing, self-supporting multilayer article circumscribing the removal element;
   removing the removable element from the first mould cavity after formation of the annular first layer;
   placing the second particulate component in a second mould cavity defined by a portion of the mould and an inner surface of the outer first layer;
   compressing the second particulate component along the first axis in the second compression step to form an inner second layer of the free-standing, self-supporting multilayer article circumscribed by the outer first layer
   placing the third particulate component in a third mould cavity defined by a portion of the mould, a portion of the outer first layer and a portion of the inner second layer; and
   compressing the third particulate component along the first axis in the third compression step to form the third layer of the free-standing, self-supporting multilayer article.

5. The method according to claim 4, further comprising:
   providing a mould defining a substantially cylindrical first mould cavity, wherein the mould comprises a substantially cylindrical removable element; within the substantially cylindrical first mould cavity;
   placing the first particulate component around the substantially cylindrical removable element in the substantially cylindrical first mould cavity;

compressing the first particulate component along the first axis in the first compression step to form a substantially cylindrical annular outer first layer of the free-standing, self-supporting multilayer article circumscribing the substantially cylindrical removable element;

removing the substantially cylindrical removable element from the substantially cylindrical first mould cavity after formation of the substantially cylindrical annular outer first layer;

placing the second particulate component in a substantially cylindrical second mould cavity defined by a portion of the mould and an inner annular surface of the substantially cylindrical annular outer first layer;

compressing the second particulate component along the first axis in the second compression step to form a substantially cylindrical inner second layer of the free-standing, self-supporting multilayer article circumscribed by the substantially cylindrical annular outer first layer;

placing the third particulate component in a third mould cavity defined by a portion of the mould, a portion of the substantially cylindrical annular outer first layer and a portion of the substantially cylindrical inner second layer; and compressing the third particulate component along the first axis in the third compression step to form the third layer of the free-standing, self-supporting multilayer article.

6. The method according to claim 5, further comprising:
compressing the second particulate component along the first axis in the second compression step to form a substantially cylindrical inner second layer of reduced height compared to the substantially cylindrical annular outer first layer;

placing the third particulate component in a third mould cavity defined by a portion of the mould, an inner annular surface and end face of the substantially cylindrical annular outer first layer and an end face of the substantially cylindrical inner second layer; and compressing the third particulate component along the first axis in the third compression step to form the third layer of the free-standing, self-supporting multilayer article.

7. The method according to claim 3, wherein the second particulate component and the third particulate component have the same composition.

8. The method according to claim 3, wherein the second particulate component and the third particulate component have different compositions.

9. The method according to claim 3, wherein the second particulate component and the third particulate component have different physical properties.

10. The method according to claim 2, further comprising:
removing the removable element from the first mould cavity after formation of the first layer;

placing a second particulate component in a second mould cavity defined by a portion of the mould and a portion of the first layer;

placing a third particulate component in a third mould cavity defined by a portion of the mould, a portion of the first layer and a portion of the second particulate component; and compressing the second particulate component along the first axis to form the second layer of the free-standing, self-supporting multilayer article and compressing the third particulate component along the first axis to form the third layer of the free-standing, self-supporting multilayer article simultaneously in a second compression step by applying a second compression force to the third particulate component, wherein the second compression force applied to the third particulate component to form the second layer and the third layer is greater than the first compression force applied to the first particulate component to form the first layer.

11. The method according to claim 1, further comprising:
removing the removable element from the first mould cavity after formation of the first layer;

placing a second particulate component in a second mould cavity defined by a portion of the mould and a portion of the first layer; and compressing the second particulate component along the first axis in a second compression step to form a second layer of the free-standing, self-supporting multilayer article by applying a second compression force to the second particulate component, wherein the first layer meets the second layer along a first interface substantially parallel to the first axis and the first layer meets the second layer along a second interface substantially perpendicular to the first axis, wherein the second compression force applied to the second particulate component to form the second layer is greater than the first compression force applied to the first particulate component to form the first layer.

12. The method according to claim 11, wherein the first particulate component and the second particulate component have different compositions.

13. The method according to claim 12, wherein the first particulate component and the second particulate component have different physical properties.

14. A method for making a combustible multilayer heat source for a smoking article, comprising:
providing a mould defining a first mould cavity, wherein the mould comprises a removable element within the first mould cavity;

placing a first particulate component in the first mould cavity;

compressing the first particulate component along a first axis in a first compression step to form a first layer of the combustible multilayer heat source by applying a first compression force to the first particulate component;

removing the removable element from the first mould cavity after formation of the first layer;

placing one or more additional articulate components in the mould, wherein a portion of the one or more additional particulate components occupies a space formerly occupied by the removable element;

compressing the one or more additional particulate components along the first axis in one or more additional compression steps after removal of the removable element to form one or more additional layers of the combustible multilayer heat source, wherein the first layer meets one of the one or more additional layers along a first interface substantially parallel to the first axis and the first layer meets one of the one or more additional layers along a second interface substantially perpendicular to the first axis; and removing the combustible multilayer heat source from the mould, wherein the one or more additional compression steps comprise applying a compression force to the one or more additional particulate components prior to removing the combustible multilayer heat source from the mould that is greater than the first compression force applied to the first particulate component to form the first layer.

* * * * *